Sept. 3, 1957 J. E. WOLFORD 2,805,331

DEVICE FOR PRE-TUNING RADIO AND TELEVISION SETS

Filed July 3, 1953 2 Sheets-Sheet 1

James E. Wolford
INVENTOR

BY C.A. Snow & Co.
ATTORNEYS.

Sept. 3, 1957 J. E. WOLFORD 2,805,331

DEVICE FOR PRE-TUNING RADIO AND TELEVISION SETS

Filed July 3, 1953 2 Sheets-Sheet 2

James T. Walford
INVENTOR

BY C. A. Snow & Co.
ATTORNEYS.

2,805,331

DEVICE FOR PRE-TUNING RADIO AND TELEVISION SETS

James E. Wolford, Charleston, W. Va.

Application July 3, 1953, Serial No. 366,020

9 Claims. (Cl. 250—20)

This invention relates to an automatic preselected function, time, time-interval device herein shown tuning radio and television receivers to preselected stations at preselected times.

An object of this invention is to provide a low cost means of automatically tuning radio and television receivers to preselected stations at preselected times.

Another object of this invention is to allow one to consult broadcast logs published daily in the newspapers or other publications, set up the desired programs for the desired length of time ahead and then without further attendance have the radio or television receiver automatically tune itself to the preselected program at the proper time.

It is a further object of this invention to provide an automatic radio and television receiver tuning device whose structure is of such low cost and simplicity so as to enable it to be economically manufactured.

A still further object of this invention is to provide an automatic tuning device for connection to radio or television receivers either by direct wiring, or by radiating a converted signal, or by mechanically coupling or by various other means, in order to tune said receiver to a prearranged sequence.

A still further object of this invention is to provide a means of preselecting functions and having these occur at the desired time for the desired time interval. As can be seen, any function that can be effected by positioning of a rotatable shaft or the making or breaking of an electrical contact, can be controlled by this device.

A timed radio receiver of this invention is meant to be applicable to present radio and television receivers and to other separate radio functions.

Other and further objects and advantages of this invention will be hereinafter described and the novel features thereof defined in the appended claims.

Figures 1, 2, 3, 4, 5:
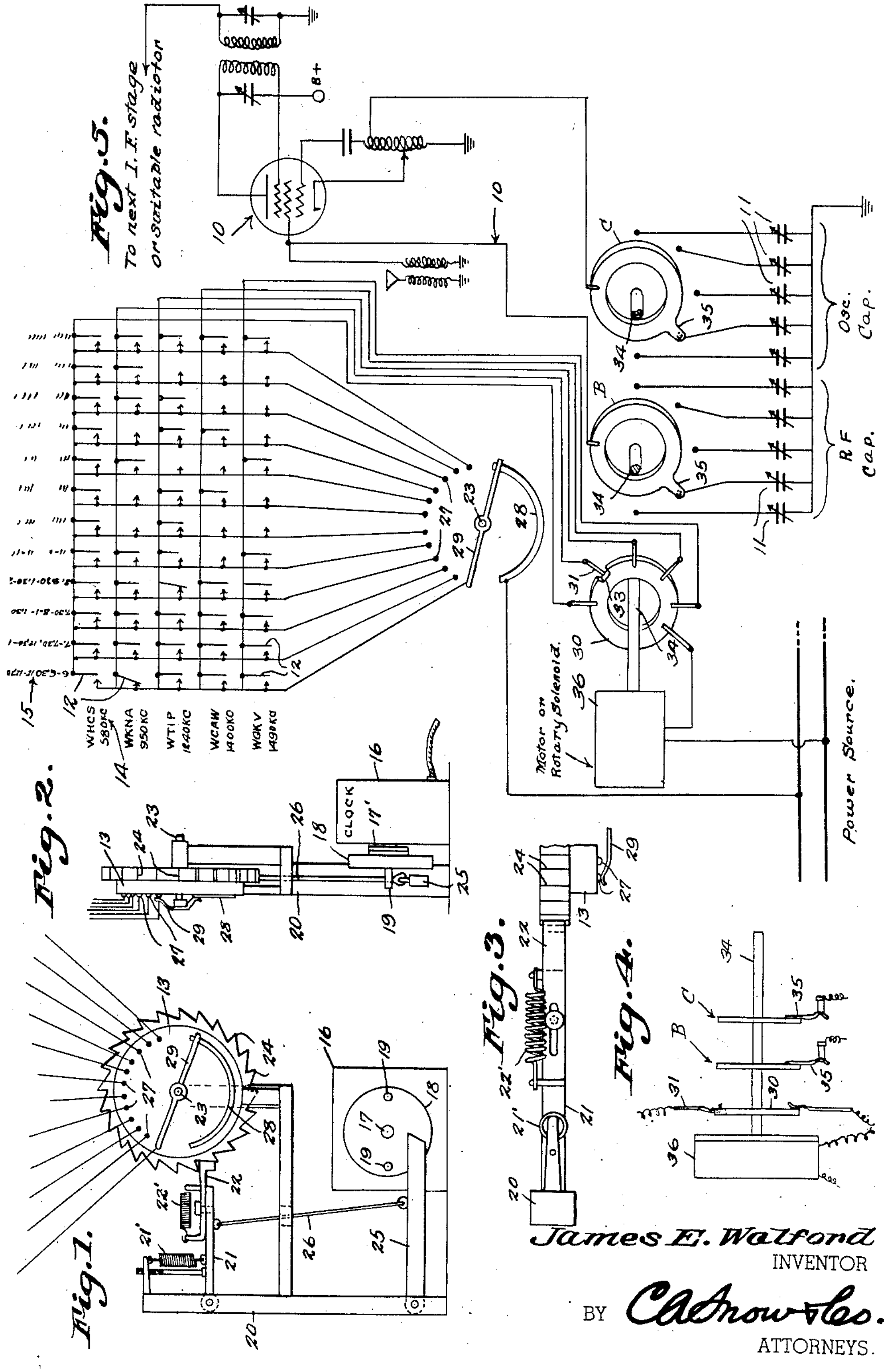
Figure 1 is a front elevation of a timing device, constructed according to an embodiment of this invention, removed from the radio.
Figure 2 is a side elevation of the timing device shown in Figure 1.
Figure 3 is a top plan view of the timing device as shown in Figures 1 and 2, parts being broken away.
Figure 4 is a diagrammatic view of the motor or rotary solenoid and function switches.
Figure 5 is a scematic view of the device showing how tuning is effected on a superheterodyne receiver.

Referring to the drawings, the device is shown being used to tune a radio receiver or converter 10 by selecting the proper set of capacitors 11 to tune the R. F. and oscillator stages of a superhetrodyne circuit 10 at the proper time. This is completed by advancing a ratchet 24 once every half hour, the shaft 23 of which is connected to a selector switch 27 and 29 which in turn is selecting one bank in a group of switches 12 whose function is to energize a motor or rotary solenoid 36 through the selector indexing switch 30 connected in such a manner as to rotate until it closes an intermediate frequency circuit that it actuates. Directly connected to the shaft 34 of this rotary solenoid 36 are function switches B and C ganged to select the proper R. F. and oscillator capacitors 11.

A chart 14 having imprinted thereon the call letters of the various stations which may be received by the radio is positioned at one end of the switches 12 to designate the station which will be operated by the switches 12 and a second chart 15 will be positioned longitudinally of the switches 12, the chart 15 carrying indicia designating the time at which the station selecting switches 12 are to be closed for tuning the radio.

For tuning the radio at a selected time, a clock 16 is provided for rotating a ratchet wheel 24. The ratchet 24 will control the selection of the time and the station to be tuned in by the radio 10 as shown on the drawings. The clock 16 is provided with a rotating drive shaft 17 to which is attached disk 18 by means of a friction clutch 17'. The disk 18 is adapted to be rotated once an hour by the clock mechanism in the clock 16 and a plurality of outwardly extending studs 19 are positioned on the disk 18 in horizontally spaced apart relation. Two studs for half hour increments are shown here as this would practically conform to most radio or television programs as their length is generally 30 minutes or multiples of 30 minutes. More studs could be added for shorter time increments if needed.

The friction clutch allows adjustment so that ratchet 24 is advanced on the precise half hour to coincide with program changes. Disk 18 can also be calibrated in minutes so as to facilitate readjustment if necessary.

A housing 20 is provided on which a cocking lever 21 is pivotally mounted at one end and a pawl 22 is pivotally and slidably mounted to the end of the cocking lever 21 for engagement with the teeth of the ratchet wheel 24. A spring 22' is connected at one end to the pawl 22 and its other end to the cocking lever 21 for biasing the pawl into driving engagement with the teeth of the ratchet wheel 24. The teeth are secured to the outer peripheral surface of the disk or wheel 24 and the pawl 22 engages flushly with the outer side surfaces of the teeth so that the pawl 22 will engage each tooth positively and will not engage the wheel 24 at any position between the teeth so that a positive selection of contacts 27 may be accomplished.

A trip bar 25 is pivotally mounted below the cocking lever 21 to the housing 20 and the free end of the trip bar 25 will be extended adjacent to the clock 16 and in spaced apart relation to the drive shaft 17 thereof. The cam pins 19, upon rotation by the clock 16 will engage the trip bar 25 and the movement of the trip bar 25, connected to the cocking lever 21 by the connecting member 26 will move the cocking lever 21 to be positioned in the next adjacent tooth of the ratchet wheel 24. A spring 21' is connected at one end adjacent to the pivoted end of the cocking lever 21 and at its other end to the housing 20 for biasing the cocking lever 21, the connecting bar 26 and the trip bar 25 into a position to be engaged by another cam stud 19 upon its rotation by the clock 16. When the disk 18 carrying the cam stud 19 is rotated past the pointed end of trip bar 25, trip bar 25 is released and allows lever 21 to advance wheel 24 one increment. Wheel 24 being connected to contact member 29 advances said contact member to the next adjacent contact 27. While the disk 18 is rotated only once per hour the wheel 24 is advanced by the cocking lever 21, twice an hour upon the engagement of the cam studs 19 with the trip bar 25, thus contact member 29 will remain on any one contact 27 for 30 minutes.

A plurality of electrical contacts 27 are fixed on a stationary insulated disk 13 fixed to a wall of the housing 20 and a semicircular contact ring 28 is provided on disk 13 adjacent to the contacts 27. A rotatable bridging contact member 29 directly connected to the shaft 23 and wheel 24 electrically engages the contact ring 28 and one of the contacts 27, periodically connecting a bank of switches in the selector circuit as determined by the position of ratchet wheel 24. When the desired time has been reached, the ratchet wheel 24 will be tripped by the studs 19 and the bridging member 29 will be connected between the segmental contact ring 28 and one of the contacts 27 for completing the circuit to one of the station-selecting switches 12 which has been manually preselected and then complete the circuit to one of the contacts 31 around the motor or solenoid indexing switch 30 and thus the motor or rotary solenoid 36 will then receive its electric energy for rotating the motor or rotary solenoid shaft until one of the circuit connecting switches 31, connected to the selected station switch 12, is positioned in the cutout portion or opening 33 of the motor or solenoid indexing switch.

The solenoid indexing switch 30 is fixed on the motor or rotary solenoid shaft 34. Also fixed on the shaft 34 are rotary switches B and C whose contact points 35 engage leads connected to the capacitors 11. The capacitors 11 are preset so that when a station is tuned in, the capacitors 11 are proper for the frequency of the selected station, and will be connected by the switches B and C, which carry the capacitor contacts 35. When the selected station is tuned in, at the selected time, the current carrying lead to the motor or solenoid switch will be interposed in the cutout portion 33 of the motor or solenoid switch 30 and hence rotate no further so that the selected station will remain in operation in accordance with the times designated on the chart 15. The station selected from the chart 14 will remain in operation until another cam member 19 engages the trip bar 25, at which time the time setting will be changed. The same station may be set for operation over more than one half hour period by placing the same station contact switches 12 into position for operation by the timed station selector during successive time intervals.

Figures 6, 7, 8:
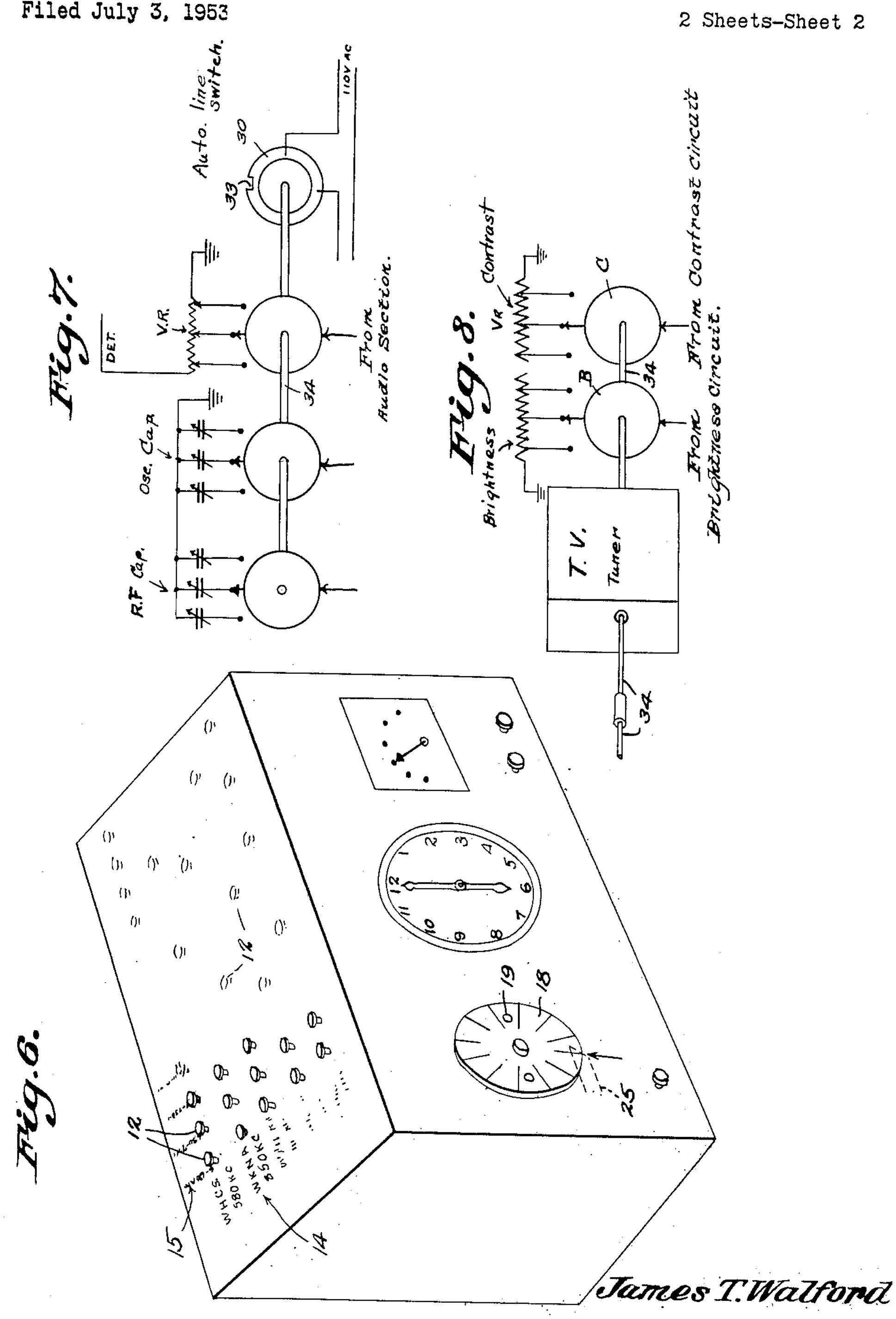
Figure 6 is a perspective view of the timing device combined into an automatic table model radio, showing manual tuning dial, clock face, exposed calibrated disk (to allow adjustment to station breaks) and push buttons as they might appear on a completed unit.
Figure 7 is a diagrammatic showing of a portion of the wiring diagram of a modified form of this invention as used on radio.
Figure 8 is a diagrammatic view of a second modified form of this invention as used on television receivers showing motor or solenoid shaft (34) mechanically coupled to a television tuner and preset taps on brightness and contrast controls.

A motor or solenoid 36 of suitable torque rotating shaft 34 may, together with the clock timing means described above for operation with a radio, also be employed for tuning in television sets. In Figure 8 of the drawings the rotary, fixed bias switches B and C may also select preselected taps on the brightness and contrast controls on a television set and, as shown in Figure 7, may also include a preset volume control and line switch.

While the specific details of one embodiment of this invention have herein been shown and described, the invention is not confined thereto as changes and alterations may be made without departing from the spirit and scope thereof as defined in the appended claims.

I claim:

1. A device for automatically tuning an electro-magnetic wave receiver for receiving a preselected frequency at a preselected time and for a predetermined interval comprising a rotatable shaft, a rotatable ratchet wheel rotatable with said shaft, a plurality of teeth on the peripheral edge of said ratchet wheel, a hollow body housing said ratchet wheel and shaft, a cocking lever pivotally engaged in one end in said housing and engageable at the other end with the teeth of said ratchet wheel, a trip bar pivoted at one end to said housing, a connecting member pivotally connected at the ends thereof to said trip bar and said cocking lever, spring means urging said cocking lever into engagement with said teeth of said ratchet wheel, a rotatable disc having outwardly extending studs engageable individually with said trip bar, a stationary insulated disc confronting said rotatable disc, clock means for rotating said rotatable disc for periodic timed engagement of said pins with said trip bar, time selector electric switches and a circuit conducting bridging member on one side of said stationary insulated disc mounted in said housing, a segmental contact ring fixed on said stationary insulated disc, said rotatable ratchet wheel effecting periodic contact between certain onces of the time selector contacts and said segmental contact ring by way of said bridging member which is mounted on said shaft of said ratchet wheel, manually operated frequency selector switches conductively connected to said time selector contacts, a second rotatable shaft, means for rotating said second shaft, an indexing switch on said second shaft, a plurality of rotary switches on said second shaft, tuning elements, a frequency selective circuit, circuit connecting means between said rotary switches and selected ones of said tuning elements and said frequency selective circuit for tuning a selected frequency at a selected time in response to said clock means.

2. The device in claim 1 in combination with a radio receiver in which said device includes variable resistors, a radio receiver volume control circuit, circuit connecting means between certain ones of said rotary switches on said second shaft and said variable resistors and said radio receiver volume control circuit for selecting a volume level corresponding to the station selected by said clock means.

3. The device in claim 1 in combination with a television receiver, in which said tuning elements constitute a television channel selector mechanism and in which said device includes variable resistors, television receiver brightness, and contrast, control circuits, circuit connecting means between certain ones of said rotary switches on said second shaft and said variable resistors and said television brightness, contrast and volume controls for selecting brightness, and contrast levels corresponding to the television channel selected by said clock means.

4. The device in claim 1, including mechanisms performing certain desired functions, and in which is included further rotary switches on said second shaft operatively connected to said function performing mechanisms to effect certain desired functions at a preselected time in response to said clock means.

5. The device in claim 2 in which is included, a rotary power line switch in the plurality of rotary switches on said second shaft, a radio receiver power line, circuit connecting between said rotary line switch and said radio receiver power line for effecting on and off switching of said radio receiver at selected times in response to said clock means.

6. An automatic device for tuning an electro-magnetic wave receiver to a selected frequency at a selected time comprising a plurality of tuning elements, a rotatable shaft, means for rotating said shaft, a plurality of rotary frequency selector switches on said shaft, an indexing switch on said shaft for indexing the rotation of said shaft and said rotary switches, means for operatively connecting selected ones of said tuning elements upon rotation of said rotary shaft and said rotary switches, a plurality of manually operative frequency selecting switches, a time controlled selector switch in circuit with said manual switches, a ratchet wheel having teeth about the periphery thereof connected to said time controlled selector switch, clock means for rotating said ratchet wheel, a clock and ratchet housing enclosing said clock means and said ratchet wheel, a cocking lever pivoted at one end in said housing, the other end of said cocking lever being engageable with the teeth of said ratchet wheel, a trip bar pivoted at one end in said housing, a connecting bar pivotally connected at the ends thereof to said trip bar and said cocking lever for advancing said ratchet wheel intermittently for connecting through said time controlled selector switch selected ones of said frequency selector switches to said indexing switch upon rotation of said ratchet wheel.

7. An automatic device for tuning an electro-magnetic wave receiver to a selected frequency at a desired time comprising an electro-magnetic wave receiver having tuning elements selector switches, a selective frequency circuit connected to said switches, a plurality of manually operative frequency selector switches, a clock having a rotatable shaft, a ratchet wheel on said clock shaft, teeth on the periphery of said wheel, a housing about said ratchet wheel and said clock, a cocking lever pivotally connected at one end to said housing, a pawl pivotally connected on the other end of said cocking lever and flushly engaging one of said teeth, a spring connected between said pawl and said cocking lever and maintaining said pawl in engagement with a tooth of said ratchet wheel, a trip bar pivotally mounted at one end in said housing, a connecting bar pivotally connected at the ends thereof to said trip bar and cocking lever intermediate the ends thereof, a pair of spaced apart members rotatably connected to said clock shaft periodically engageable with said trip bar for advancing said ratchet wheel a tooth at a time, spring means urging said trip bar, cocking lever and said pawl into engagement with the teeth for intermittently advancing the rotation of said ratchet wheel, an insulated disk secured in said housing, electric contacts on said insulated disk, circuit connecting means between said contacts and said frequency selector switches for operatively connecting said tuning element switches to said electro-magnetic wave receiving circuit upon rotation of said ratchet wheel.

8. An automatic device for tuning an electro-magnetic wave receiver to a selected frequency at a desired time comprising an electro-magnetic wave receiver having tuning elements selector switches, a frequency selective circuit connected to said switches, a clock having a rotatable shaft, a ratchet wheel on said clock shaft, teeth on the periphery of said wheel, a housing about said ratchet wheel and said clock, a cocking lever pivotally connected at one end thereof to said housing, a pawl pivotally connected on the other end of said cocking lever and flushly engaging one of said teeth, a spring connected between said pawl and said cocking lever and maintaining said pawl in engagement with a tooth of said ratchet wheel, a trip bar pivotally mounted at one end in said housing, a connecting bar pivotally connected at the ends thereof to said trip bar and cocking lever intermediate the ends thereof, a pair of spaced apart members rotatably connected to said clock shaft periodically engageable with said trip bar for advancing said rachet wheel a tooth at a time, spring means urging said trip bar, cocking lever and pawl into engagement with the teeth for intermittently advancing the rotation of said ratchet wheel, an insulated disc secured in said housing, electric contacts on said insulated disc extending outwardly therefrom, circuit connecting means between said contacts and said selector switches for operatively connecting said tuning elements switches to said frequency selective circuit upon rotation of said ratchet wheel.

9. A device for automatically tuning an electro-magnetic wave receiver for receiving a preselected frequency at a predetermined time and for a predetermined interval comprising a clock shaft, a disc on one end of said clock shaft rotatable therewith, outwardly extending radially spaced apart studs on said disc parallel to and radially spaced from said clock shaft, a second shaft parallel to and spaced from said clock shaft, a peripherally toothed wheel on said latter shaft, a housing enclosing said shafts, said wheel and said disc, a trip bar pivoted at one end on a wall of said housing, the other end of said trip bar engageable with said studs upon rotation of said clock shaft, a cocking lever pivoted at one end to said housing extending substantially parallel to said trip bar, the other end of said cocking lever engaging the teeth of said wheel, a connecting member pivoted at the ends thereof to said cocking lever and said trip bar intermediate the length of each, conductive radially spaced contacts on said wheel, a conductive bridging member on said second shaft engageable with said contacts upon rotation of said clock shaft, tuning elements, a frequency selective circuit, indexing means and circuit conducting means between said indexing means and selected ones of said contacts for connecting selected tuning elements in said electro-magnetic wave receiver at a selected time in response to said disc on said clock shaft.

References Cited in the file of this patent

UNITED STATES PATENTS

| | | |
|---|---|---|
| 1,975,781 | Flehr | Oct. 9, 1934 |
| 1,992,327 | Powell | Feb. 26, 1935 |
| 2,048,742 | Horelick | July 28, 1936 |
| 2,068,227 | Cutler et al. | Jan. 19, 1937 |
| 2,154,994 | Prescott | Apr. 18, 1939 |
| 2,248,116 | Peters | July 8, 1941 |
| 2,257,537 | Samburg | Sept. 30, 1941 |
| 2,636,981 | Benow | Apr. 28, 1953 |